Sept. 8, 1953  J. B. THOMAS ET AL  2,651,257
STENCIL PRINTING APPARATUS
Filed March 3, 1949  7 Sheets-Sheet 1

INVENTORS
JOHN B. THOMAS
BY COURTNEY E. MOORHOUSE

ATTORNEY

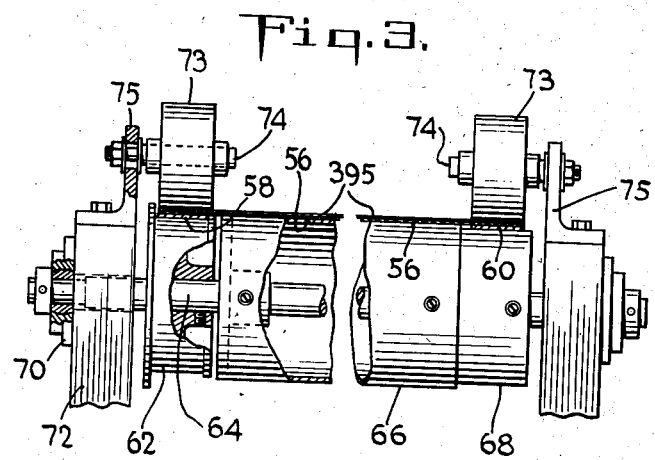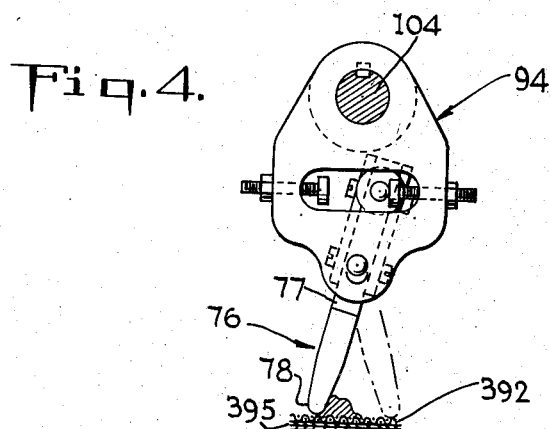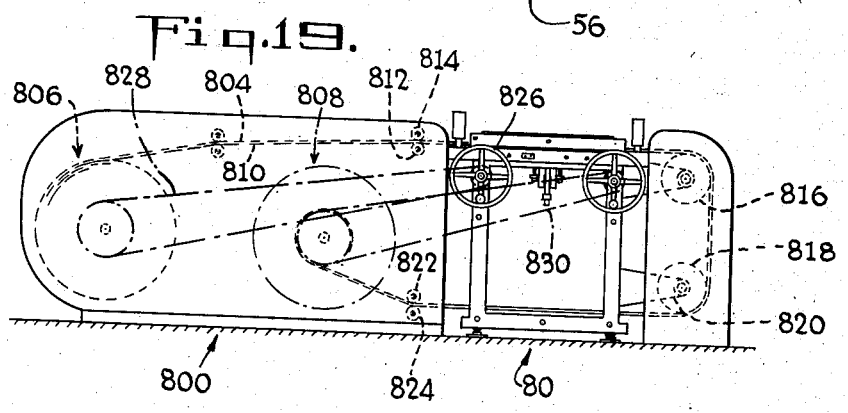

Sept. 8, 1953  J. B. THOMAS ET AL  2,651,257
STENCIL PRINTING APPARATUS
Filed March 3, 1949   7 Sheets-Sheet 3
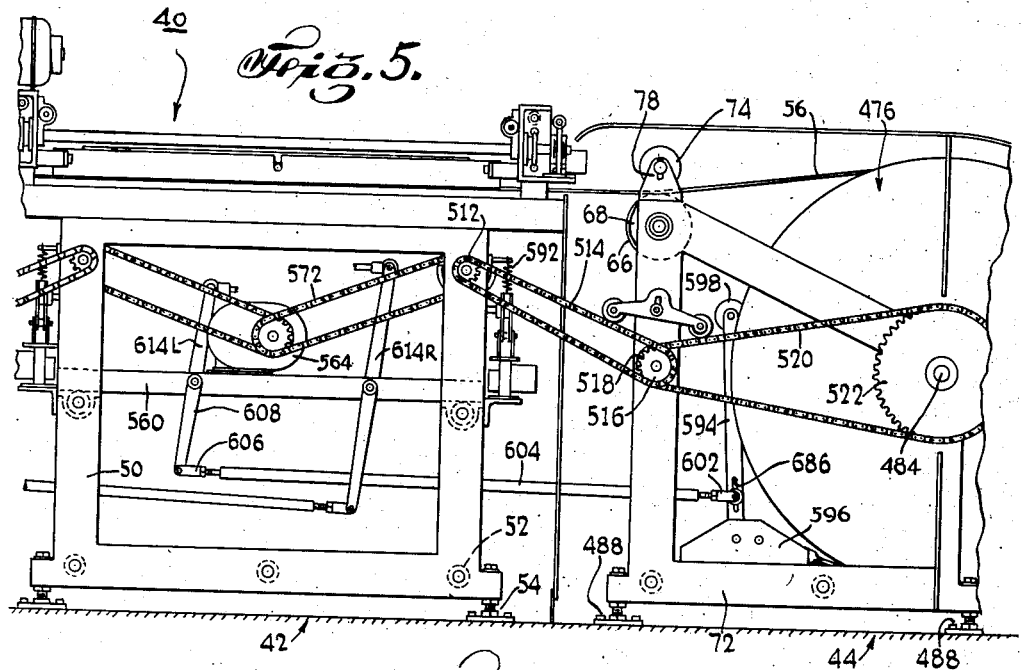
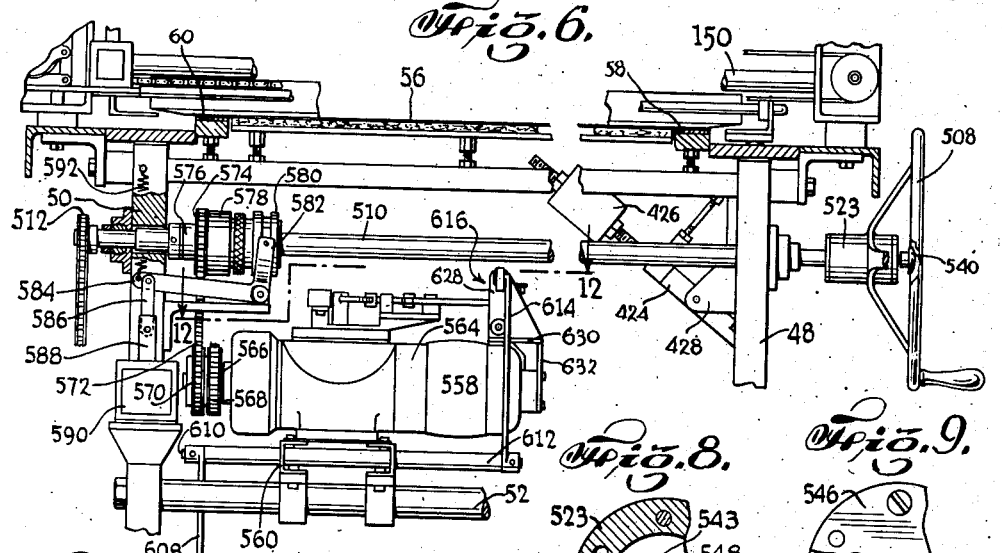
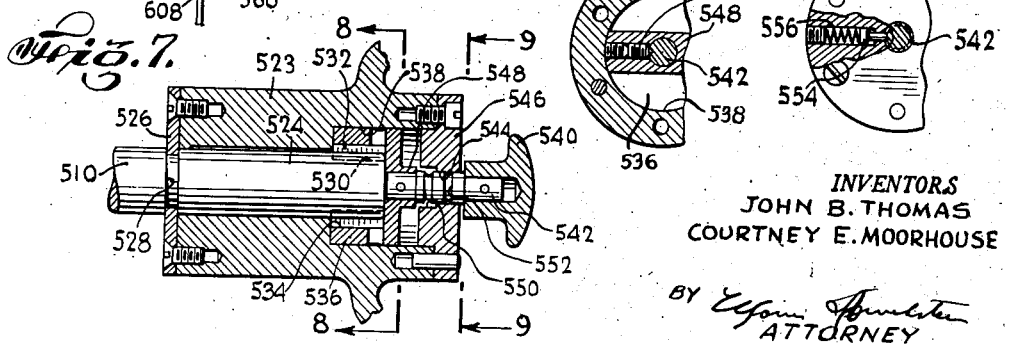
INVENTORS
JOHN B. THOMAS
COURTNEY E. MOORHOUSE
BY
ATTORNEY

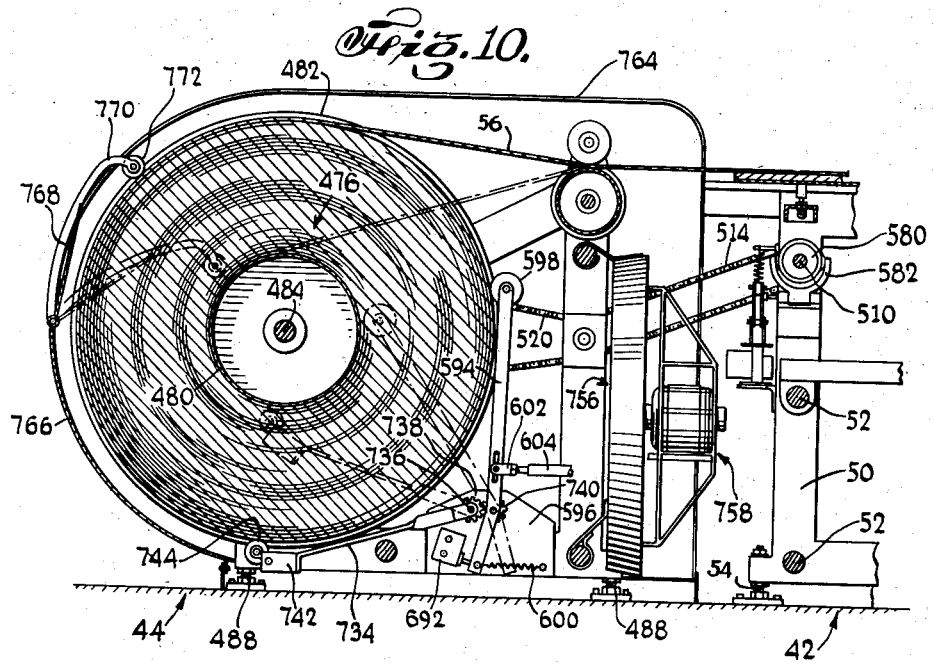
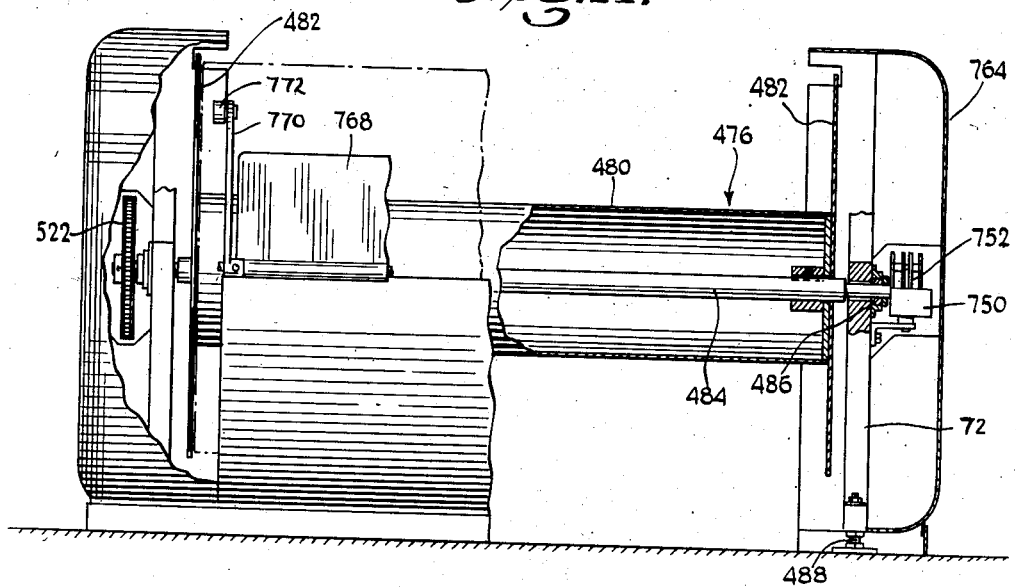

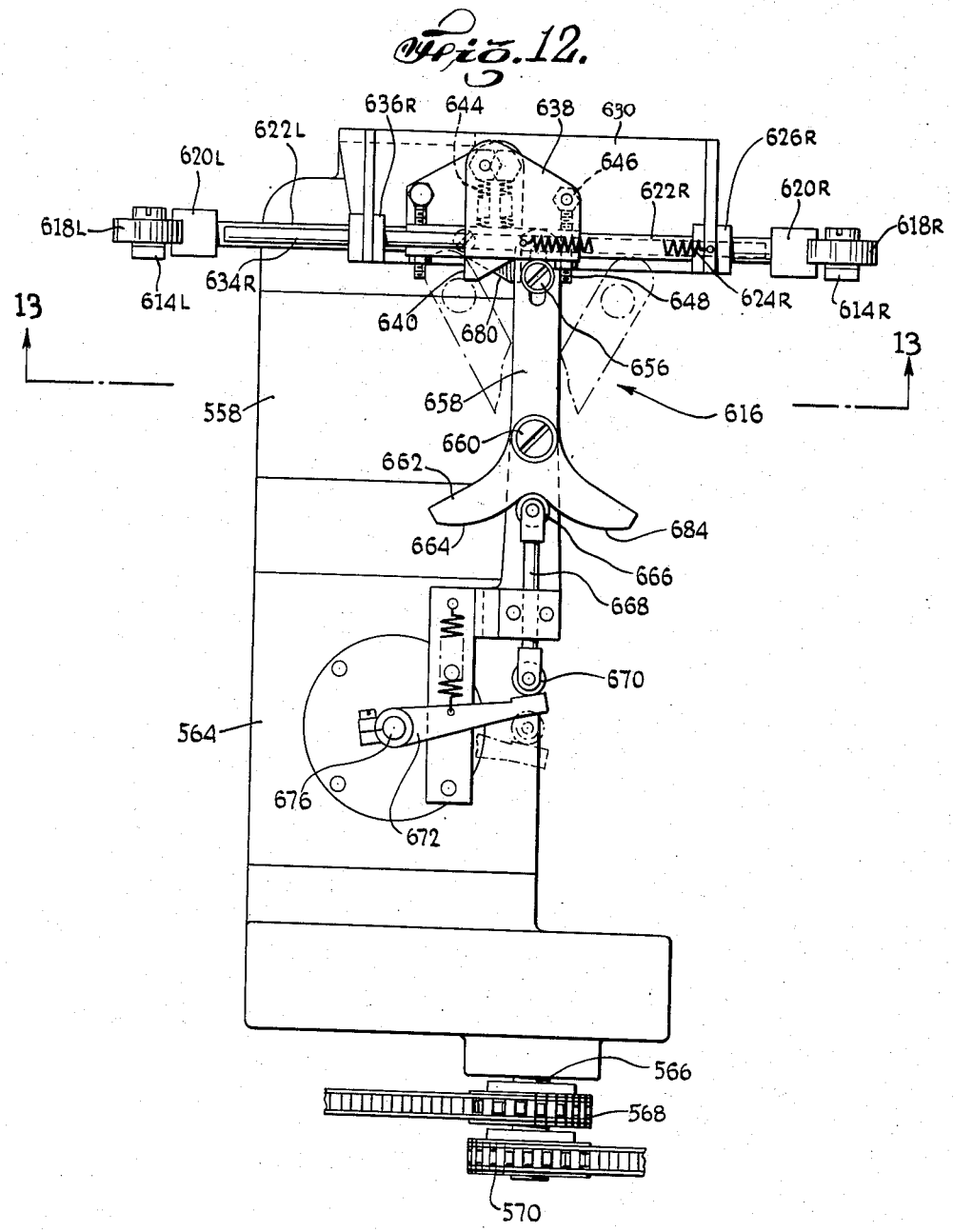

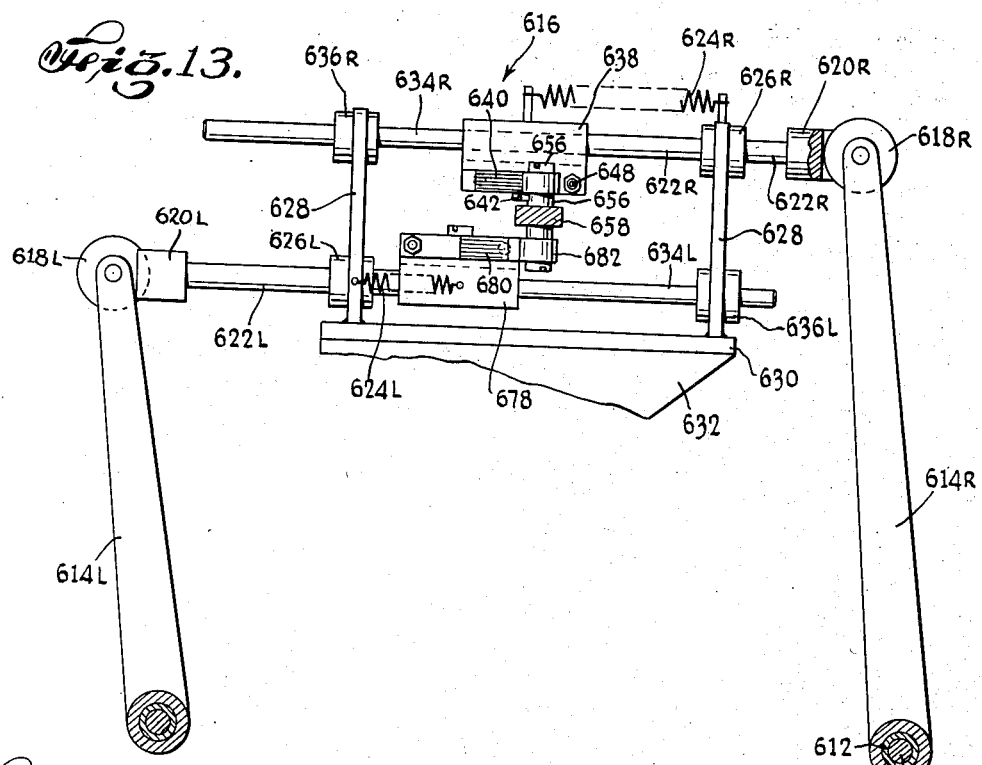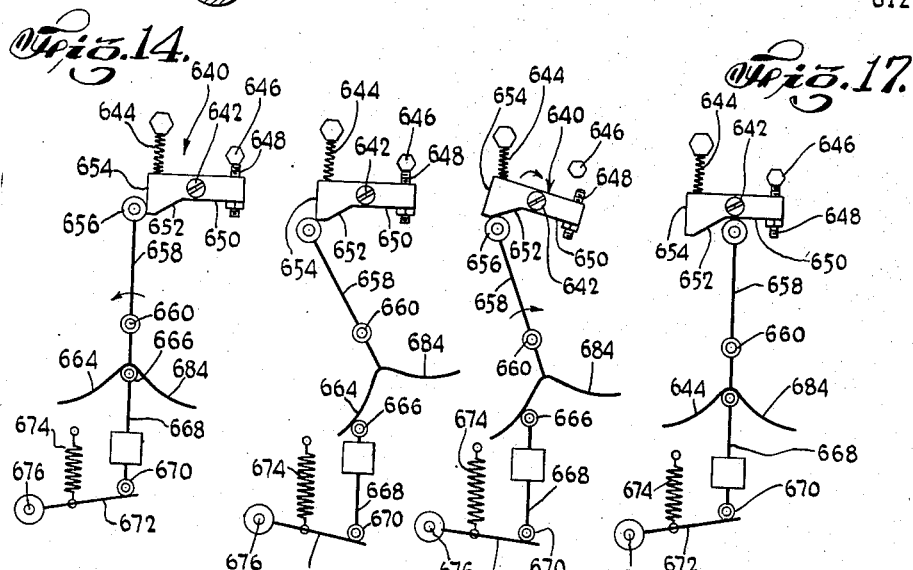

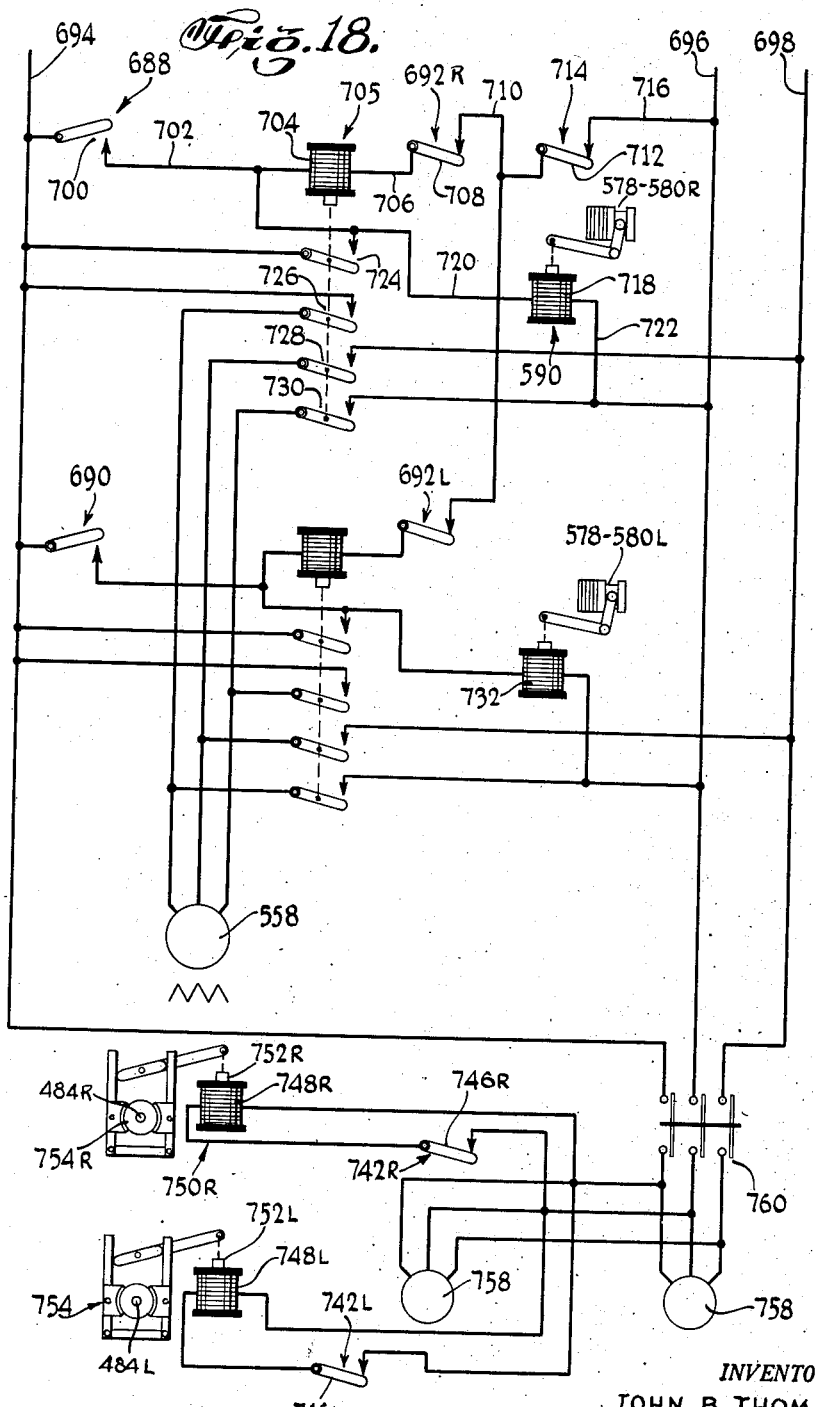

Patented Sept. 8, 1953

2,651,257

UNITED STATES PATENT OFFICE 2,651,257

STENCIL PRINTING APPARATUS

John B. Thomas, Watertown, Conn., and Courtney E. Moorhouse, West Englewood, N. J., assignors to Roto-Matic Screen Printer, Ltd., New York, N. Y., a corporation of New York Application March 3, 1949, Serial No. 79,413

18 Claims. (Cl. 101—407)

This invention relates to an apparatus for printing sheets such as textile fabric webs, plastic films and paper with the aid of a stencil. For simplicity, such apparatus will be referred to hereinafter simply as a "silk screen printing machine," it being understood that said term is merely a trade designation for a stencil printing machine and does not indicate that the stencil necessarily is of silk.

It is an object of our invention to provide a silk screen printing machine which is rugged in construction and is easy to disassemble for repair and replacement of parts.

It is another object of our invention to provide a silk screen printing machine having an improved means for maintaining a web carrying blanket in proper transverse (front to back) registry, said means being such that it will not impose much wear on the blanket or any of its parts.

It is another object of our invention to provide a power driven means for moving the blanket at a uniform linear speed, particularly during drying and application of a textile web.

It is another object of our invention to provide a silk screen printing machine in which the blanket is prevented from sagging on reels at such time as the same are not being turned, whereby to keep the blanket compactly wound and prevent the textile web from brushing against the floor or machine parts.

It is another object of our invention to provide a blanket power drive which optionally may be hand actuated, being so constructed that when the power drive is rendered effective the hand actuated reel turning means may be disengaged, whereby an operator cannot be caught in a rapidly moving actuating handle.

It is another object of our invention to provide a silk screen printing machine in which an air blast is directed onto the surface of the web on the take-up reel, and in which the direction of the air blast is varied as the reel fills up so that said blast will always strike the freshly printed portion of the web.

Other objects of our invention will in part be obvious and in part be hereinafter pointed out.

Our invention accordingly consists in the features of construction, combinations of elements and arrangements of parts which will be exemplified in the constructions hereinafter described, and of which the scope of application will be indicated in the appended claims.

Certain features of our invention shown and/or described, but not claimed herein, are shown, described and claimed in our copending application, Serial No. 726,504 filed on February 5, 1947, for Stencil Printing Apparatus of which the present application is a division and in our copending application, Serial No. 79,412 filed March 3, 1949, for Stencil Printing Apparatus.

In the accompanying drawings in which are shown various possible embodiments of our invention, Fig. 1 is a top plan view of a silk screen printing machine constructed in accordance with our invention and with many details (elsewhere shown) omitted in order to prevent confusion;

Fig. 3 is an enlarged sectional view taken substantially along the line 3—3 of Fig. 2, and is explanatory of the construction of the keeper wheel, and the idler and guide roll for maintaining the blanket in proper transverse registry;

Fig. 4 is an enlarged sectional view taken substantially along the line 4—4 of Fig. 1;

Fig. 5 is a rear view of the silk screen printing machine with certain details omitted for the sake of clarity;

Fig. 6 is a left hand side view of the printing table partly broken away to show the organization of the speed control for the blanket motor drive;

Fig. 7 is a sectional view through the mechanism for disengageably connecting the blanket hand wheel drive;

Figure 1:
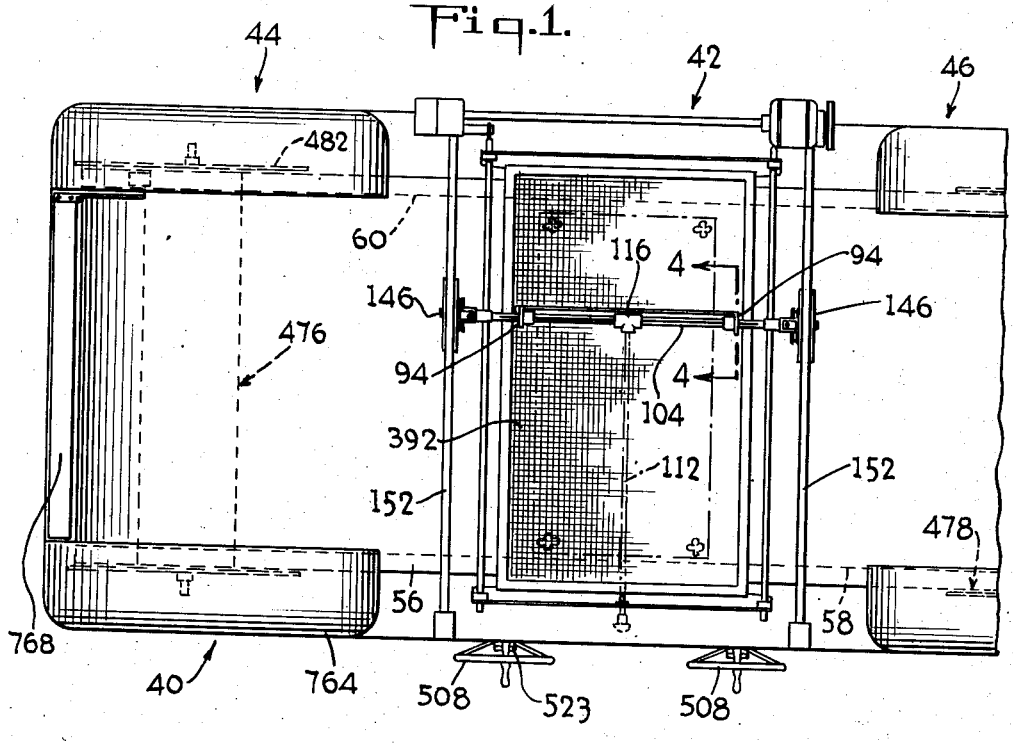

Figs. 8 and 9 are sectional views taken substantially along the lines 8—8 and 9—9 respectively of Fig. 7;

Fig. 10 is a transverse sectional view through one of the blanket reels;

Fig. 11 is a side view of the reel shown in Fig. 10, with portions thereof broken away to illustrate the internal construction;

Fig. 12 is a top plan view of the speed control for the blanket motor drive, said view being taken substantially along the line 12—12 of Fig. 6;

Fig. 13 is a sectional view taken substantially along the line 13—13 of Fig. 12;

Figs. 14, 15, 16 and 17 are progressive schematic views of the operative elements of the speed control for the blanket motor drive;

Fig. 18 is a wiring diagram of the circuit for the blanket motor drive, and

Fig. 19 is a schematic front view of a machine embodying a modified form of our invention.

In general we carry out our invention by providing a silk screen printing machine of the type comprising a printing table to both sides of which reels are supported. One reel serves as a supply reel for an elongated flexible blanket and the other as the blanket take-up reel. The blanket functions as a carrier for a long web of a textile fabric which is to be printed. Printing is achieved through the use of a screen carried on a frame, printing ink being placed on the screen and expressed through pervious portions of the screen by a scraper which moves back and forth between two ends of the screen in a direction transverse to the length of the web.

The blanket is moved between successive printing operations (repeats) by the manipulation of hand wheels, and said hand wheels are arranged to be disengaged from the blanket drive when the same is motor driven as, for example, when a web is being applied or being dried. The control for the blanket motor drive operates to move the blanket at a uniform linear rate over the printing table. It should be observed in this regard that the blankets usually are made of a material such as plain linoleum which does not lend itself to a constant speed drive at the printing table but must be driven by turning the take-up reel. Inasmuch as the diameter of the blanket on the take-up reel constantly varies, the mechanism for driving the blanket at a constant linear speed includes means for driving the take-up reel at a variable angular speed inversely proportional to the diameter of the blanket on said reel.

The machine has many other features, a general description of which is not needed at this point to obtain an overall understanding of the machine's basic operation and elements.

General organization (Figs. 1, 2, 5, 6 and 10)

Referring now in detail to the drawings, 40 denotes a silk screen printing machine embodying our invention and comprising a printing table 42 to either side of which a supply or take-up reel 44, 46 is disposed. The printing table 42 includes a front frame 48 and a rear frame 50 interconnected by tie rods 52. Said table is adapted to be secured to a firm support, such as a floor, and is set by means of levelling screws 54 so that the top of the table is approximately horizontal.

Figure 2:
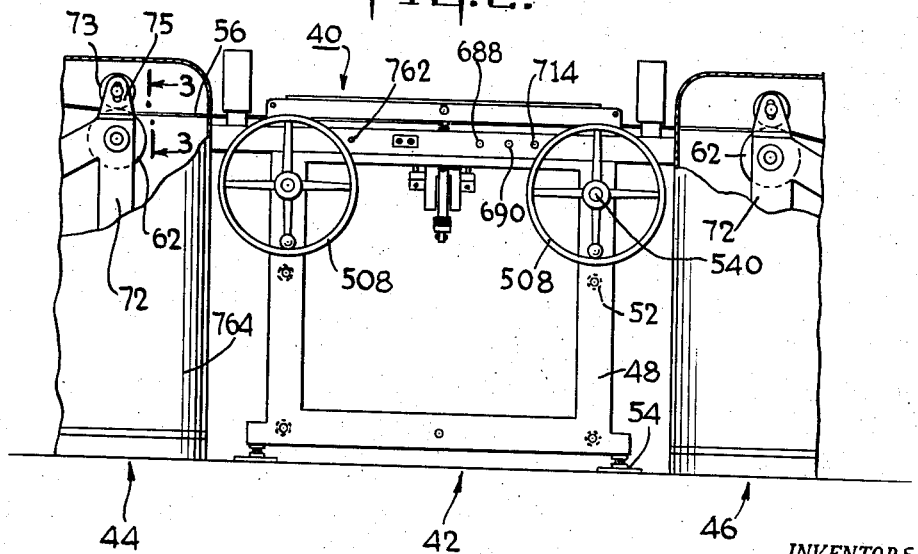
Fig. 2 is a front view of said machine, various details likewise being omitted.

The blanket and its front-to-back registering mechanism (Figs. 2, 3 and 5)

The textile web to be printed is adhesively secured to a blanket 56 of flexible material capable of being rolled and rerolled many times without breaking, and yet heavy enough to maintain its own shape when printing pressure is applied thereto. A material which has been found satisfactory for this purpose is heavy commercial linoleum. The blankets are relatively long, for example, seventy-five yards, one end of the blanket being secured by a pressure sensitive adhesive tape to one of the reels and the other end in like manner to the other of the reels. The blanket passes across the table top, being supported there in a manner described in detail in our said copending applications. As the blanket is led from one to the other of the reels its position in a front-to-back sense must be held constant so that successive prints will be in front-to-back registration. Heretofore such registration has been accomplished with guides engaging the edges of the blanket itself. These greatly reduced the effective life of the blanket by wearing and marking its lateral edges or by actually starting tears at said edges. Furthermore, due to the flexibility of the wide blanket, such guides sometimes caused buckling and did not afford accurate registration.

Pursuant to a feature of the present invention, we accomplish such registration by providing narrow guide and spacer belts 58, 60 at the front and back of the blanket adjacent lateral edges thereof. Conveniently, said belts are secured to the undersurface of the blanket, the attachment being effected in any suitable manner, for instance by means of an adhesive, or by mechanical fastening means such as rivets or by sewing. Said belts may be made of the same material as the blanket, i. e., linoleum, or any other flexible and relatively strong substance such as rubber alternatively can be employed.

As the blanket passes from one of the reels to the table and from the table to the other of the reels the belts engage two front-to-back registering means whose construction is best seen in Fig. 3. Each said means includes a double flanged guide sheave 62 mounted to rotate about a horizontal axis extending in a front-to-back direction underneath the blanket. Said sheave snugly receives between its flanges the front guide and spacer belt 58. The sheaves are located in proximate relationship to the printing table one to either side thereof as seen in Fig. 2. For this purpose said sheaves either may be journaled in bearings supported from the table or from the reel carrying cradles, the latter type of support being illustrated herein.

It is convenient to associate said sheaves with idling rollers which carry the weight of the belt as it approaches and leaves the table. Accordingly, each sheave 62 is secured to a shaft 64 which also has mounted thereon an idler roller 66. Said idler roller is of reduced diameter at its rear 68 to accommodate the rear guide and spacer belt 60. The idler roller shaft 64 is journaled at its ends in self-aligning flanged cartridge bearings 70 which are secured to the cradle frames 72 for the supply and take-up reels.

Means also is included for holding the blanket down against each idler roller and guide sheave. Such means comprises a pair of keeper wheels 73 rotatably supported on shafts 74 vertically adjustably bolted to angle brackets 75 fastened to the cradle frames. The front keeper wheel captively holds the front guide and spacer belt 58 between the flanges of the guide sheave 62 and the rear keeper wheel holds the back edge of the blanket against the idler roller and prevents the blanket from skewing when the diameter of the associated reel is so large that the top of the reel is higher than the idler roller.

The scraper (Fig. 4)

Printing ink is forced through the stencil by an elongated scraper blade 76 comprising a rigid backing member or body 77 whose tip 78 is either rigid or resilient depending upon the particular manner in which the machine is used. The scraper blade 76 illustrated herein is entirely rigid, being composed, by way of example, from a thermosetting plastic. The lower portion of the blade is slightly tapered and the tip 78 thereof rounded as best seen in Fig. 4. The ends of said blade are journaled in a pair of blade hangers 94 which are supported on a draw bar 104. The ends of the draw bar are mounted in carriages 146 which ride between rails 150, 152 extending in a front-back direction on opposite sides of the table.

The draw bar can be moved back and forth across the stencil screen either by power, as described in detail in our copending application, Serial No. 726,504, or by hand with the aid of a handle 112 attached to a sleeve 116 on the draw bar.

*The stencil screen and its support*
(Figs. 1, 4 and 5)

The stencil screen constitutes a piece of fabric 392 which has pervious and impervious areas defining a design. The screen has an oblong shape, being elongated in a front-to-back direction. The edges of the screen are secured in a suitable manner, as by glueing, clamping or stapling, to a stencil screen frame of any self-form maintaining material, such for example as wood. When the scraper is functioning, the stencil rests on a textile web 395 carried by the blanket 56. When the scraper is idle and it is desired to shift the blanket in order to bring a fresh portion of the web beneath the screen, the screen is elevated as described in detail in our copending application, Serial No. 726,504.

*Manual drive for the blanket*
(Figs. 1, 2 and 5-10)

The opposite ends of the blanket 56 are detachably secured, as with pressure sensitive adhesive tape, to reels 476, 478 (Figs. 1, 10 and 11) one of which may serve as the supply reel and the other as the take-up reel depending upon the direction of blanket travel. Each reel consists of a hollow reel barrel 480 having lateral flanges 482 which support a reel shaft 484 journaled in self-aligning flanged cartridge bearings 486 which are carried by the cradle frames 72. Said frames are held off the floor by levelling screws 488.

The supply and take-up reel may be turned over either by hand or by motor.

The hand drive is performed with a pair of hand wheels 508 (Figs. 2 and 6) mounted on hand wheel shafts 510 journaled in the front and back frames 48, 50 of the printing table. Each shaft is kinematically connected to a different reel, the connections being similar for the two shafts. For instance, the left-hand shaft has a sprocket 512 (Figs. 5 and 6) fixed to its rear end. Said sprocket engages a chain 514 trained over a sprocket 516 journaled on the cradle frame 72 and mounted to rotate with a sprocket 518 driving a chain 520. This latter chain is trained around a sprocket 522 (Figs. 5 and 11) fixed to the reel shaft 484.

It will thus be apparent that one of the hand wheels, if turned in the proper direction, will cause its associated reel to pull the blanket over the printing table 42 from the other reel. If desired, while one hand is being used to drive one of the reels, the other hand may be used as a check on the other hand wheel to prevent the same from being overdriven through the blanket. This will impart a slight tension to the portion of the blanket on the printing table. After a print is made through the stencil, the blanket is advanced two frames so that on the forward pass of the blanket every other frame is printed. On the return pass the omitted frames are printed. The blanket is advanced the proper amount by means of the hand wheels and is set in predetermined position by lining up marks (not shown) on the blanket with an indexing mark (likewise not shown) on the front printing frame.

When the blanket is power driven there is danger that, if the hand wheels are turned thereby, an operator's hands, clothing or hair may be caught. To prevent this, the machine includes means to selectively connect the hand wheels to the reel shafts for rotation therewith. Said means is best shown in Figs. 1 and 6-8 where it will be seen to comprise a hub 523 integral with the hand wheel and journaled on the front end 524 of the shaft 510. A split washer 526, bolted to the back of the hub and having its inner periphery received in an annular groove 528 on the shaft, serves as a keeper to prevent axial movement of the hub relative to the handwheel shaft while permitting said hub to rotate with respect to said shaft. The forward tip of the handwheel shaft is formed with a pair of diametrically opposite longitudinal slots 530 in which keys 532 are fixed. These keys slide in grooves 534 formed in an axially reciprocating plunger 536 slidable in a well 538 in the hub surrounding the front tip of the shaft. The plunger is bored to slidably receive said shaft so that it will now be seen that the plunger can reciprocate axially of the shaft but is keyed to the shaft for rotation therewith.

The plunger is shifted by means of a knob 540 pinned to one end of a detent shaft 542 whose other end is fixed to the plunger by set screws 543. Said shaft is slidable in a passageway 544 in a cap 546 bolted to the front of the hand wheel hub, said cap serving to limit outward movement of the plunger. The plunger carries a diametrically elongated ridge 548 and the cap is formed with a mating diametric slot 550. When said ridge is in the slot the plunger and cap will be locked for mutual rotation, thus causing the handwheel shaft 510 to turn with the handwheel. When the ridge is out of the slot rotation of the reel shaft will not spin the handwheel. Thus, pushing the knob in will disengage the ridge and slot, while pulling the knob out will couple said ridge and slot when the handwheel and handwheel shaft are in the proper relative angular position.

It is desirable to include means for maintaining the knob in either coupled or uncoupled positon. Said means comprises a pair of annular grooves 552 on the detent shaft 542. These grooves are spaced axially of said shaft a distance equal to the desired movement of the plunger. The cap carries a detent pin 554 urged toward the detent shaft by compression spring 556 and adapted to be selectively received in one or the other of the grooves 552.

*The power drive for the blanket*
(Figs. 5, 6, 10 and 12)

After a textile web has been fully printed with a color, it is desirable to move it back and forth between the two reels for drying. Pursuant to the present invention, such movement of the web, and more particularly of the blanket on which the web is supported, is effected by means of a motor 558 mounted on cross channel irons 560 supported by the tie rods 52. Said motor operates a speed reduction drive 564 whose output shaft 566 carries two sprockets 568, 570. One of the sprockets e. g. the inner sprocket 568 is adapted to drive one of the reels e. g. the right hand reel 478 and the other sprocket is adapted to drive the other reel 476. The connections between said sprockets and their associated reels are identical, so that only one will be described by way of example.

The sprocket 570 engages a chain 572 trained about a sprocket 574 keyed to a sleeve 576 revolvable on the left hand wheel shaft 510. Said sleeve also carries the rear half 578 of a clutch whose forward half 580 is splined on said left hand handwheel shaft. The clutch is of standard construction, being such that if the forward half thereof is moved toward the rear half the clutch will transmit power and if the forward half is moved away from the rear half the two halves of the clutch will be uncoupled.

This movement of the forward half is accomplished by forming said half with a pair of spaced collars between which collars the forked end 582 of a bell crank lever rides. The other end 584 of said lever is connected by a link 586 to the armature 588 of a solenoid 590. Said armature is urged to extended position by a spring 592, whereby, when the solenoid is deenergized, the clutch will be uncoupled. Under normal conditions, the solenoid is not energized so that the two handwheel shafts may be operated independently of the motor 558. However, when one or the other of the clutches 578—580 are coupled, said motor will drive either the right hand or left hand reel.

*Uniform speed control for the power blanket drive*

(Figs. 5, 6, 10 and 12–17)

The power drive for the blanket is primarily employed for three purposes, to wit: to actuate the blanket during drying, to actuate the blanket during application of a web and to actuate the blanket during stripping or removal of the web. Under any one of these conditions, it is highly desirable to have the blanket advanced at a uniform speed regardless of the diameter of the blanket on the take-up reel. Means, therefore, is provided to control the speed at which said take-up reel is turned in inverse proportion to the diameter of the blanket on said reel; that is to say, the machine includes means to rotate the take-up reel slower as the diameter of the blanket thereon increases. Said means basically includes a sensing element associated with each reel and responsive to the diameter of the blanket thereon, and a mechanism controlled by the position of the sensing element on the reel, which at the time is operating as a take-up reel, to vary the speed ratio of the reduction drive 564.

The means for controlling the blanket motor drive so as to obtain a constant blanket speed comprises a master caliper arm 594 associated with each of the reels. Each caliper arm is rotatably mounted on a bracket 596 supported by the cradle frame 72. The axis of rotation of said arm preferably is parallel to the reel shaft 484 and is so located with respect to the reel and the arm is of such length, that one end of the arm will always be above the center of the reel shaft. This end of the arm carries a roller 598 which is urged against the reeled blanket by a tension spring 600. The point of engagement between the roller and reeled blanket is above the center of the reel so that the blanket at said point is relatively compact. Thus, the angular position of the caliper arm is a function of the diameter of the outermost turn of the blanket on the reel.

Each master caliper arm is adjustably and pivotally connected to a turnbuckle 602 (Fig. 5) attached to one end of a push rod 604 whose other end is pivotally connected by another turnbuckle 606 to a radius arm 608 fixed on a countershaft 610 (Fig. 6). Said shaft is journaled in a sleeve 612 and carries a swinging lever 614 located adjacent a means 616 for varying the speed ratio of the reduction drive 564.

Since both caliper arms have the same linkage system as that just described, there will be two swinging levers 614 adjacent said speed varying means, one to each side thereof. For convenience, these levers will be denoted as the swinging levers 614R and 614L, the lever 614R being that controlled by the right hand reel (the reel which is at the right hand of an operator facing the front of the machine) and the lever 614L being that controlled by the left hand reel. Inasmuch as the two push rods 604 cross beneath the center of the printing table, the swinging lever 614L will be at the right hand side of the machine and the swinging lever 614R will be at the left hand side of the machine.

The swinging levers each carry a roller 618R—618L which rides in the slotted end of a follower 620R—620L supported at one end of a cam push rod 622R—622L which is biased towards the roller 618R—618L by a light tension spring 624R—624L. Said rod is slidably journaled in a bearing 626 supported in one of a pair of plates 628 which are welded to a cam mounting block 630, said block being attached to a fish plate 632 secured to the housing of the motor 558. As will be apparent from Fig. 13, both swinging levers 614R—614L operate a similar kinematic train, the only difference between said trains residing in the fact that the push rod 622R is above the push rod 622L and said push rods are moved in opposite directions by their respective swinging levers. Each push rod has a pilot rod 634R—634L journaled in a bearing 636R—636L in the opposite plate 628. Said push rods are suitably constrained against rotary movement, as for example by making these rods of non-circular cross section, e. g. square. In the illustrated machine this constraint is accomplished by cooperation between the roller 618R—618L and the slot in the follower 620R—620L.

The push rod 622R has fixed to it a dog supporting block 638 on whose undersurface a dog 640 is rotatably mounted by means of a shoulder screw 642. Said dog is biased in a counterclockwise direction (as viewed from the top of the machine) by a compression spring 644 and its movement in this direction is limited by a stop 646 against which a pin 648 adjustably mounted on the dog 640 is adapted to abut. The operative portions of the dog 640 comprise a surface 650 (Figs. 14–17) parallel to the longitudinal axis of the cam push rod when the dog is in normal position (when the pin 648 abuts the stop 646), another surface 652 adjacent the surface 650 and inclined outwardly away from the longitudinal axis of said rod when the dog is in normal position, and a surface 654 substantially perpendicular to the surface 650 and comprising a blunt end for the dog. This latter surface 654 is such that pressure against the same at a point remote from the spring 644 will tend to rotate the dog in a counterclockwise direction. Said dog cooperates with a roller 656 having a vertical axis of rotation and journaled on a cam lever 658. This lever is pivotally secured to the block 630 by a shoulder screw 660 and suitable means, shortly to be described, biases the lever to the position illustrated in solid lines in Fig. 12, this being a neutral or normal position occupied by the lever when the drive of either reel in a take-up direction is being started.

The end of the cam lever remote from the roller carrying end has an arm 662 with a cam surface 664 engaging a roller 666 on a follower rod 668. This rod supports another roller 670 in an engagement with a control arm 672 urged against the roller 670 by a tension spring 674. The control arm 672 is the governing element of the speed reduction drive 564. Said drive is of any conventional type such that, when the control element is moved, the reduction ratio from the motor shaft to the output shaft 556 is varied. By way of example, in the illustrated machine a reduction speed drive of the planetary gear type is employed, the same being manufactured by Graham Transmissions, Inc. of Milwaukee, Wisconsin. This drive has a speed reduction which is varied by rotating a shaft 676 to which the control arm 672 is fixed.

The speed reduction drive is so arranged that, when the control arm is in its normal position, shown in full lines in Fig. 12, a certain minimum speed reduction is obtained, i. e. in this position of the control arm the motor 558 will drive the reel on which the blanket is being taken up at a predetermined maximum speed. When the control arm is in the position indicated by the dot and dash lines in Fig. 12 a certain maximum speed reduction is obtained and the driven reel will be turned at its predetermined slowest speed. The speed reduction drive 564 is such that the rate of change in the speed reduction ratio is approximately directly proportional to the change in angular position of the control arm.

When one of the reels is empty the swinging lever 614R—614L associated therewith will be remote from the nearest plate 628, as exemplified by the left hand lever 614L in Figs. 12 and 13. If the right hand reel 478 is empty, the block 638 moved by the lever 614R will be pulled by the spring 624R toward the plate in which its push rod is journaled. This will dispose said block and its dog 640 to one side (the right side as viewed in Figs. 12 and 13) of the roller 656 on the cam lever. The parts will then be in the relative positions schematically indicated in Fig. 14.

If the motor 558 now is actuated to drive the right hand reel in a take-up direction, the swinging lever 614R will slowly move over toward the plate 628 as the reel starts to fill up. As this movement begins, the end surface 654 of the dog 640 will push against the roller 656 turning the cam lever in a counterclockwise direction as viewed from the top of the machine, this being the condition illustrated in Fig. 14. Swinging the cam lever causes the cam surface 664 to turn about the screw 660. Said surface is designed to shift the follower 668 against action of the spring 674, the surface being so shaped that it will change the rate at which the drive 564 reduces the speed of the reel in direct proportion to the increase in the diameter of the blanket as sensed by the master caliper arm 594 and swinging lever 614R.

Inasmuch as the angular position of the swinging lever 614R is directly proportional to the diameter of the reeled blanket and since the change in angular position of the cam lever 658 is approximately directly proportional to the change in angular position of the swinging lever 614R, the cam surface 664 may be approximately an Archimedean spiral, if the change in the speed ratio of the drive 564 is directly proportional to the change in angular position of the control arm 672. It will, of course, be understood that the cam surface 664 may be slightly modified in case the linkage system, the dog and cam lever, and the response of the speed reduction drive to the control arm is not exactly as above described. The modification will be such that the speed at which the take-up reel is turned will be inversely proportional to the diameter of the blanket on said reel.

In the operation of the device, after the dog has pushed the roller 656 over to a tripping point where said roller clears the edge of the surface 654, the roller will begin to swing back to its idle position moving in a clockwise direction. This extreme point is indicated in Fig. 15. As the roller starts to swing back under the restoring influence of spring 674, it will turn the dog 640 in a clockwise direction about the shoulder screw 642 against the action of the spring 644 as indicated in Fig. 16. The cam lever will come to rest in its idle position as indicated in Fig. 17 on the opposite side of the inclined surface 652. The roller now is barely in contact with the surface 650, said roller being adjustably mounted on the cam lever 658 for this purpose (see Fig. 12).

Thus far there has only been described the kinematic train interconnecting the control arm 672 and the dog actuated by the cam push rod 622R. A similar train connects the other push rod 622L and said control arm. This train includes a dog supporting block 678 on the lower push rod. Said block has pivotally secured to its uper face a dog 680 which is the mirror image of a dog 640. The dog 680 is in line with the dog 640 but is offset to the left as best seen in Fig. 12. The spacing between said dogs is such that, when the cam lever 658 snaps back to normal position after having been actuated by one of said dogs, it will rest against the end surface 654 of the other dog.

It is to be noted that, when the roller 656 is moving back to normal position and pushing out of its way the dog which has just actuated it, it will simultaneously engage the inclined surface 652 of the other dog to depress said latter dog and likewise move it out of the way, so that there is nothing to prevent the cam lever from being restored to idle position.

It has been taken for granted in the foregoing description that the same roller 656 is engaged by both dogs. However, two rollers are provided, to wit: the roller 656 already mentioned and a second roller 682 which depends from the cam lever 658 and is aligned with the roller 656.

The dog 680, when operative, acts to turn the cam lever 658 in a clockwise direction from the solid line position shown in Fig. 12 to the right hand dot-and-dash position. As it moves in this direction, the cam surface 640 is not effective. Accordingly we provide a second cam surface 684 likewise approximately in the shape of an Archimedean spiral and a mirror image of the cam surface 665. The cam surface 684 cooperates with the roller 666 in the same manner as the cam surface 664.

The position of the dogs should be so adjusted with respect to the diameter of the blanket and the reel that the effective dogs will be tripped by the roller 656 moving to idle position when the take-up reel is as full as desired. Said adjustment may be accomplished by controlling the settings of the turn buckles 602, 606. If it is desired to shorten or lengthen the range of movement of the dogs in order to obtain a wider range of speed control, the turn buckle 602 may be moved along the length of the caliper arm 594, a slot 686 being formed in said arm to enable such adjustment to be effectuated.

*The electric control for the power blanket-drive*

(Figs. 2, 10 and 18)

When, in the operation of the machine, it is desired to drive the blanket by motor in a given direction, as for example onto the right hand reel, a right hand starting button 688 (Fig. 2) is momentarily depressed. This will turn the motor 558 over in the proper direction and at the same time energize the solenoid 590 on the right hand clutch so that the right hand reel will be power driven. The speed of the reel upon starting will be high since at this time the roller 666 is at the meeting point of the two diverging cam surfaces 664, 684. If it is desired to have the left hand reel acting as the take-up reel the left hand starting button 690 is pressed. Regardless of which button is depressed, the knobs 540 on the right and left hand handwheels should first be pushed in, so that said wheels will not turn as the blanket is power-driven.

When the blanket is being driven by motor there is a tendency for the operator to relax his attention and there is a possibility that the drive of the take-up reel may continue so far that it will pull the end of the blanket off the supply reel. To prevent this from happening, an automatic stop means is included in the circuit for the motor 558, said means being operative to open the circuit for the motor when the take-up reel has had a predetermined length of blanket convoluted thereon. Said stop means, as shown herein, consists of a momentary switch 692 adjustably mounted on each of the brackets 596 with the actuating finger thereof in the path of travel of the lower end of the master caliper arm 594. The contacts for said switch are normally closed and will open when engaged by the lower end of the caliper arm. This arrangement also prevents the motor from starting up an already full take-up reel, if the wrong blanket motor starting button is depressed.

The electric wiring circuit for the blanket motor 558 is shown in Fig. 18. Said motor is energized from a three-phase power line consisting of three buses 694, 696, 698. One phase 694—696 is used for the control circuit. When the right hand starting button 688 is depressed it closes a pair of normally open contacts 700 to complete a circuit from bus 694 to bus 696 through the momentarily closed contacts 700, a wire 702, an operating coil 704 of a right hand relay 705, a wire 706, a set of normally closed contacts 708 of the momentary switch 692R associated with the right hand master caliper arm, a wire 710, a set of normally closed contacts 712 of a momentary stopping switch 714 (Fig. 2), and a wire 716.

Depressing the right hand starting button also energizes an operating coil 718 of the solenoid 590 for the right hand clutch 578—580R from wire 702 through wires 720, 722.

As soon as the right hand relay 705 is energized it closes four pairs of normally opened contacts 724, 726, 728, and 730. The contacts 724 serve to provide a holding circuit for said relay and the remaining three contacts energize the motor in a right hand sense, that is to say, in such direction that, if connected to the right hand reel, it will turn the same in a proper direction to make said reel pull the blanket across the printing table. It is pointed out that closing the holding contacts 724 provides an alternative circuit to maintain the operating coil 718 energized after the right hand starting button is released.

Once the motor has been energized in a right hand sense it will continue to move the blanket on to the right hand reel at a constant linear speed until either the right hand reel is full enough to actuate the momentary switch 692R or until the operator pushes the stop button 714.

The circuit controlled by the left hand starting button 690 is substantially similar to that just described, being effective however to energize a solenoid 732 for the left hand clutch 578—580L instead of the right hand clutch and connecting the buses 694, 696, 698 to the motor 558 with one phase reversed.

*Anti-sag control*

(Figs. 10, 11 and 18)

When the blanket is stopped, at some time during or at the end of its travel, when printing or drying or applying or stripping a web, there is a tendency for the two reels to turn a few degrees in an unwinding direction so as to relieve the tension in the portions of the blanket overlying the printing table and in the convoluted turns of the blanket on the reels. There also is a tendency for the supply reel to turn under its own momentum even when no longer driven. These actions have two undesirable results, to wit, they slacken the portion of the blanket on the printing table and they permit the lower portion of the outermost turn of the reeled blanket to sag. The slackening of tension on the printing table may, depending upon the condition of the blanket, permit the blanket to become so distorted that it will interfere with printing, and the sag in the outermost turn of the blanket will cause the blanket to become loosely wound.

Pursuant to an ancillary feature of our invention, these difficulties are overcome by the provision of an anti-sag mechanism which basically comprises means to secure the reels against rotation when the sag in the reels exceeds a certain predetermined amount. Said means comprises a secondary caliper arm 734 rotatable about a pin 736 and mounting a gear 738 which meshes with another gear 740 fixed to the master caliper arm 594. The two gears have the same pitch diameter and number of teeth. The secondary caliper arm is adjustable relative to the gear 738 in order that the position of said arm may be set in such fashion that the tip thereof will be near (but not touching) the bottom of the outermost turn of the blanket on which the roller 598 rests higher up. A momentary switch 742 is adjustably secured to the tip of the secondary caliper arm, said switch having a roller actuating element 744.

In the operation of the anti-sag mechanism the roller 598 will always be pressed against a firm portion of the reeled blanket and will move in and out as the blanket is taken up or fed. Such motion will cause the actuating element 744 to move toward and away from the shaft 484 but to always be spaced a short distance from the bottom of the outermost turn of the reeled blanket, because of the setting of the secondary caliper arm. If, however, when the reel is stopped, the blanket should unreel and permit the outermost turn of the blanket to sag, said turn will after moving a short distance downward press against the roller actuating element 744 to operate the same.

As shown in Fig. 18 the momentary switch 742 has a pair of normally closed contacts 746 series-connected in the operating circuit for a coil 748 of a solenoid 750 whose armature 752 operates a brake 754 on the shaft 484 of the reel associated with the switch 742. The anti-sag mechanism just described is at the left hand side of the machine and its components characterized by a qualifying letter "L." An exactly similar anti-sag mechanism is provided on the right hand side of the machine, the same being denoted by the qualifying letter "R." The brakes 754 are spring loaded to effective position, that is they will be set when their operating coils are deenergized and will release upon actuation of said coils. Said brakes are quite light and the reels can easily be turned by hand even when one or both brakes are on. However, the brakes are heavy enough to prevent the blankets from unreeling by themselves so that, in ordinary printing operation, if, after the blanket has been advanced two frames, there is sufficient friction in the reel shaft bearings to prevent the reels from turning further, the brakes will stay free, but, if the reel should turn so much that the blanket would tend to become markedly loose, the brakes will set before this occurs.

*The drying mechanism*

(Figs. 1, 2, 10, 11 and 18)

The freshly printed web can be dried in any suitable manner, fans 756 being shown herein for that purpose. Said fans are driven by motors 758 supplied from the buses 694—698 and controlled by a fan switch 760 operated by a button 762 on the front frame of the printing table (Fig. 2). It is pointed out that the power for the brakes 754 is derived from the fan circuit inasmuch as it is desired to avoid leaving the power for the brakes on when an operator goes away from a machine, and there is but little chance that the operator will walk away and leave the fans running over night.

Two fans are provided, one for the left hand and one for the right hand reel. Said fans blow air toward the side of the reel closest to the printing table, the fans being located near the floor so that each stream of air generated is directed toward the lower surface of the wound blanket on the reel. The air moved by the fan is confined and directed toward and around the freshly printed surface of the blanket by a housing 764 substantially surrounding each of the reels and its cradle frame. The front and back walls of the housing are located close to the reel flanges 482, and the end wall 766 of the housing is curved so as to form a deflector which guides the air up around toward the top of the outermost convoluted layer of the blanket.

It is desirable to change the angle at which air leaves the surface 766 in order to direct such air upon the variably positioned top surface of the outermost layer of the blanket. To accomplish this, a vane 768 is pivoted to the end wall 766 in a fashion such as to turn about an axis parallel to the reel shaft. Said vane fixedly carries a follower lever 770 having a roller 772 at its free end which rests on the wound blanket. The roller is so positioned with respect to the vane that, as the reel fills up, the vane will continue to blow air downwardly but at a changing angle on the freshly printed surface of the web coming on to the top of the reel.

It may be mentioned that the belts 58, 60 function to space apart adjacent convoluted and not yet fully dried layers of the textile web. If the fabric is not dried by the action of the fans on the printing pass alone, the blanket can be power-driven back and forth between the reels with the fans going until the web is dried sufficiently to either remove or to print the next color thereon.

*An alternative blanket support*

(Fig. 19)

Instead of having the two reels 44, 46 disposed on opposite sides of the printing table, we may locate said reels on the same side of the table as shown in the machine 800. This modified machine has the advantage that, it can be manufactured more economically and adjusted more readily than the machine 40.

Said machine 800 is essentially similar to the machine 40, and includes a printing table 802, a scraper and a scraper actuating means identical with those hereinabove described. A blanket 804 is attached at its opposite ends to reels 806, 808 mounted alongside the printing table 802, both said reels being located to the left of the table as viewed in Fig. 19. Said blanket has a pair of narrow guide and spacer belts 810 permanently secured to its lower surface adjacent the lateral edges thereof, these belts being employed for the purpose of front-to-back (transverse) registration. The reels 806, 808 are rotatably supported in any suitable manner, e. g. in the same fashion as the reels 44, 46.

The portion of the blanket extending between the outer reel 806 and the printing table travels over an idling roller 812 having a construction like that of the roller 66, in that its front end includes a double flanged guide sheave to receive the front belt 810 and its rear end is of reduced diameter to accommodate the rear belt. A vertically adjustable keeper wheel 814 prevents the blanket 804 from riding up high enough to allow the front belt 810 to leave the flanged front sheave of the roller 812. A similar keeper wheel overlies the portion of the blanket above the rear belt.

On the (right hand) side of the machine opposite to that on which the two reels 806, 808 are disposed, we provide means for turning the blanket back so that a portion of the blanket which has left one of the reels and traversed the printing table (either in printing or nonprinting position) will retraverse said table in order to reach the other reel. Said blanket turning means may comprise guide or return rollers the number of which will depend upon the specific construction and arrangement of the various components of the printing machine. As illustrated herein, we have disclosed two such guide rollers 816, 818, the upper 816 of which has its top surface at or slightly below the printing level for the blanket 804. Both rollers are rotatably supported by outrigger bearings 820. The lower roller 818 has its undersurface located at a level of the machine where no operating components are located beneath the printing table. In the machine 800 such a level is present beneath the motor which is used for power driving of the blanket 810.

Another idler roller 822, situated on the same side of the machine as the reels 806, 808, may be included to insure passage of the blanket at a fixed plane beneath the printing level. Keeper wheels 824 are associated with the roller 822 to hold the blanket in contact therewith regardless of the diameter of the portion of the blanket wound about the reel 808.

The guide roller 816, like the roller 812, has a forward flanged sheave to receive the front belt 810 and maintain transverse registration of the blanket at the right hand side of the machine. Likewise the rear of the roller 816 is of reduced diameter to accommodate the rear belt. If desired, the rollers 818 and 822 also may include front flanged sheaves and stepped down rear ends.

It may be mentioned that under various other circumstances where the machine parts carried by the printing table are not identical with those shown in Figs. 1–18, only a single guide roller such as roller 816 need be employed.

The machine 800 includes a pair of hand wheels 826 which actuate chains 828, 830, one connected to the reel 806 and the other to reel 808 so that turning the left hand handwheel will turn over the reel 806 and turning the right hand handwheel will turn over the reel 808.

It will thus be seen that we have provided machines which achieve the several objects of our invention and are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described our invention, we claim as new and desire to secure by Letters Patent:

1. In combination in a silk screen printing machine, a printing table, an elongated flexible blanket, means to move said blanket lengthwise across said table in contact with the top thereof, a belt secured to the surface of the blanket adjacent a lateral edge thereof and running lengthwise of the blanket, and means adjacent the table to prevent transverse shifting of said blanket on said table, said last named means comprising a pair of rotary retaining elements adapted to engage the opposite lateral edges of said belt and means disposed on the opposite side of said blanket to maintain said belt between said rotary members.

2. In combination in a silk screen printing machine, a printing table, an elongated flexible blanket, means to move said blanket lengthwise across said table in contact with the top thereof, a belt secured to a surface of said blanket adjacent the lateral edge thereof and running lengthwise of the blanket, and means adjacent the table to prevent transverse shifting of said blanket on said table, said last named means comprising a rotary member having spaced flanges adapted to snugly receive the belt therebetween and a member disposed on the opposite side of the belt to maintain said belt between said flanges.

3. In combination in a silk screen printing machine, a printing table, an elongated flexible blanket, means to move said blanket lengthwise across said table in contact with the top thereof, a belt secured to the undersurface of said blanket adjacent a lateral edge thereof and running lengthwise of the blanket, and means adjacent the table to prevent transverse shifting of said blanket on said table, said means comprising a rotary member mounted for rotation about an axis below the blanket and perpendicular to the direction of travel of the belt, said member having a pair of spaced flanges between which the belt is adapted to be snugly received, and a keeper wheel mounted above the blanket for rotation about an axis parallel to the axis of rotation of the rotary member, said keeper wheel being disposed to prevent the blanket from jumping up and allowing the belt to leave the space between the flanges.

4. In combination in a silk scren printing machine, a printing table, an elongated flexible blanket, means to move said blanket lengthwise across said table in contact with the top thereof, a belt secured to the undersurface of said blanket adjacent a lateral edge thereof and running lengthwise of the blanket, and means adjacent the table to prevent transverse shifting of said blanket on said table, said means comprising a rotary member mounted for rotation about an axis below the blanket and perpendicular to the direction of travel of the belt, said member having a pair of spaced flanges between which the belt is adapted to be snugly received, and a keeper wheel mounted above the blanket for rotation about an axis parallel to the axis of rotation of the rotary member, said keeper wheel being disposed to prevent the blanket from jumping up and allowing the belt to leave the space between the flanges, the mounting for said keeper wheel being vertically adjustable.

5. In combination in a silk screen printing machine, a printing table, an elongated flexible blanket, means to move said blanket lengthwise across said table in contact with the top thereof, a belt secured to the undersurface of said blanket adjacent a lateral edge thereof and running lengthwise of the blanket, and means adjacent the table to prevent transverse shifting of said blanket on said table, said means comprising a pair of idler rolls one on each side of the printing table to support the blanket as it approaches and leaves the table, each idler roll including spaced flanges adapted to snugly receive the belt between them, and keeper wheels above the blanket and associated with said pairs of flanges for preventing the blanket from rising up to an extent sufficient to permit the belt to leave the spaces between the flanges.

6. In a silk screen printing machine, a printing table, an elongated flexible blanket, a pair of reels to act as supply and take-up reels for the blanket, a pair of hand wheels, separate kinematic means including a clutch interconnecting each of said wheels with a different reel whereby either one of said reels may be turned by hand, a power driven rotary member, and kinematic means including a clutch independent of said first-named clutches interconnecting said rotary member and each of said reels in such manner as to turn said reels in a take up direction only.

7. In a silk screen printing machine, a printing table, an elongated flexible blanket, a pair of reels to act as supply and take-up reels for the blanket, a single power driven means for selectively turning either one of said reels in a take up direction only, and a single means for varying the angular speed at which a selected reel is turned in inverse proportion to the increase in the diameter of the blanket wound on the reel, so that the linear speed of the blanket across the printing table in either direction is constant.

8. In a silk screen printing machine, a printing table, an elongated flexible blanket, a pair of reels to act as supply and take-up reels for the blanket, a motor, a single variable speed drive operated by said motor, means to selectively turn either one of said reels from said variable speed drive, said variable speed drive having a single variably positioned member the position of which determines the speed ratio of said drive, means operationally responsive only to the diameter of the blanket on the reel being driven, and means kinematically interconnecting said last named means and the variably positioned member to reduce the speed at which the motor turns over the take-up reel as the diameter of the blanket increases thereon in such fashion that the blanket will be pulled at a substantially uniform linear speed in either direction across the table.

9. In combination a source of power, an elongated flexible member whose opposite ends are wound on reels, a motor, a variable speed drive operated by said motor and selectively operating either one of said reels, said drive including a variably positioned element whose position is determinative of the output speed of the variable speed drive, a member associated with each of said reels the position whereof is a function of the diameter of the elongated member wound on said reel, a cam, a cam follower moving said variably positioned element, said members being arranged to alternately engage the cam and move the same away from a normal position and to disengage the cam when the associated reel is full, and means to move said cam back to normal position when thus disengaged, said members being so arranged that when said cam moves back to normal position after being disengaged by either member it will be engaged by the other member.

10. In a silk screen printing machine, an elongated flexible member, a reel on which said member is wound, a pair of sensing elements associated with said reel and positioned at different locations angularly of said reel, one of said elements resting upon the surface of the member wound on said reel and the other of said elements being disposed radially further from the reel than the first element and near the surface of the member wound on said reel, and means controlled by said first named element to move said second named element radially of said reel whereby as the diameter of the member wound on the reel changes said second named element will be disposed at approximately the same distance from the surface of said member.

11. A combination as set forth in claim 10 wherein the second named sensing element is disposed adjacent a lower portion of the member wound on the reel.

12. A combination as set forth in claim 10 wherein the second named sensing element is disposed adjacent a lower portion of the member wound on the reel and carries control means operable by the member in the event that a lower portion of the outermost convolution of the member sags more than a predetermined amount.

13. In a silk screen printing machine, an elongated flexible member, a reel on which to take up or supply said member, a pair of sensing elements associated with said reel and positioned at different locations angularly of said reel, one of said elements resting upon the surface of the member wound on said reel and the other of said elements being disposed near the surface of the wound member, means controlled by said first named element to move said second named element radially of said reel whereby as the diameter of the member wound on the reel changes said second named element will be disposed at approximately the same distance from the surface of said wound member, said second named sensing element being disposed adjacent a lower portion of the reel, a control means carried by said second named sensing element, and a brake for checking the rotation of the reel, said brake being controlled by said control element whereby the brake will be applied when the outermost convolution of the wound member sags more than a predetermined amount.

14. In a silk screen printing machine, an elongated flexible member adapted to move across said table, a reel for taking up or supplying said member, a master caliper arm pivotally mounted adjacent the reel, said arm being so disposed that the free end thereof swings through a path intersecting the member wound on the reel at a point above the center thereof, means to urge said free end to rest upon the wound member so that the position of said master caliper arm will be a function of the diameter of the wound member, a secondary caliper arm mounted to swing through a path such that its free end intersects the wound member at a lower portion of the member, means interconnecting both said caliper arms in a fashion such that the free end of said secondary caliper arm is always spaced slightly further from the center of the reel than the free end of said master caliper arm, switch means on the free end of said secondary caliper arm, a brake, electro-responsive means for controlling said brake, and circuit means interconnecting said electro-responsive means and said switch in a fashion such that upon actuation of said switch by the wound member said brake will check rotation of said reel whereby, if the sag of the wound member at the lowermost portion thereof exceeds a predetermined amount, said reel will be braked.

15. In a silk screen printing machine, an elongated flexible blanket adapted to support a web to be printed, a reel for taking up said blanket, a fan to blow air across one side of the printed surface of the outermost convolution of the web wound on the reel, and means to direct the air to the opposite side of the outermost convolution, said last named means including a vane whose angular position varies in accordance with the diameter of the web wound on the reel.

16. In a silk screen printing machine, an elongated flexible blanket, a pair of reels to act as supply and take-up reels for the blanket, a motor, a variable speed drive operated by said motor, means to selectively turn either one of said reels from said variable speed drive, said variable speed drive having a variably positioned member the position of which determines the speed ratio of said drive, means operationally responsive only to the diameter of the blanket on the reel being driven, and means kinematically interconnecting said last-named means and the variably positioned member to reduce the speed at which the motor turns over the take-up reel as the diameter of the blanket increases thereon in such fashion that the blanket will be pulled at a substantially uniform linear speed across the table, said last-named means including a cam, a cam follower which moves said variably positioned element and a member for moving said cam in response to an increase in diameter of the blanket on the take-up reel, said member being arranged to become disengaged from said cam when the take-up reel is filled.

17. In a silk screen printing machine, an elongated flexible blanket, a pair of reels to act as supply and take-up reels for the blanket, a motor, a varaible speed drive operated by said motor, means to selectively turn either one of said reels from said variable speed drive, said variable speed drive having a variably positioned member the position of which determines the speed ratio of said drive, means operationally responsive only to the diameter of the blanket on the reel being driven, and means kinematically interconnecting said last-named means and the variably positioned member to reduce the speed at which the motor turns over the take-up reel as the diameter of the blanket increases thereon in such fashion that the blanket will be pulled at a substantially uniform linear speed across the table, said last-named means including a cam, a cam follower which moves said variably positioned element and a pair of members each of which is responsive to the position of a different reel, the member associated with the reel acting as a take-up reel at any time controlling the position of the cam up to the time that such reel is filled, whereupon said member is arranged to become disengaged from said cam and said cam is arranged to become engaged by the other member.

18. In a silk screen printing machine, an elongated flexible blanket, a pair of reels to act as supply and take-up reels for the blanket, a motor, a variable speed drive operated by said motor, means to selectively turn either one of said reels from said variable speed drive, said variable speed drive having a variably positioned member the position of which determines the speed ratio of said drive, means operationally responsive only to the diameters of the blanket on the reel being driven, and means kinematically interconnecting said last-named means and the variably positioned member to reduce the speed at which the motor turns over the take-up reel as the diameter of the blanket increases thereon in such fashion that the blanket will be pulled at a substantially uniform linear speed across the table, said last-named means including a cam, a cam follower for moving said variably positioned element and a pair of members each of which is responsive to the position of a different reel, said members being arranged to alternately positively engage said cam and to move to a position in which the member engaging the cam disengages the cam whereby said members will alternately control the movement of the cam.

JOHN B. THOMAS.
COURTNEY E. MOORHOUSE.

References Cited in the file of this patent

UNITED STATES PATENTS

| Number | Name | Date |
| --- | --- | --- |
| 872,777 | Wickel | Dec. 3, 1907 |
| 903,518 | Strasburg | Nov. 10, 1908 |
| 1,972,380 | Flanigan | Sept. 4, 1934 |
| 2,019,375 | Wheelwright | Oct. 29, 1935 |
| 2,026,025 | Duncan et al. | Dec. 31, 1935 |
| 2,070,797 | Marchev et a. | Feb. 16, 1937 |
| 2,210,474 | Tillett | Aug. 6, 1940 |
| 2,226,807 | De Save | Dec. 31, 1940 |
| 2,233,771 | Comi | Mar. 4, 1941 |
| 2,452,339 | Uhlig | Oct. 26, 1948 |
| 2,462,376 | Fleisher et al. | Feb. 22, 1949 |
| 2,466,977 | Weiss | Apr. 12, 1949 |
| 2,485,289 | Jane | Oct. 18, 1949 |

FOREIGN PATENTS

| Number | Country | Date |
| --- | --- | --- |
| 463,004 | Great Britain | Mar. 19, 1937 |